US006063480A

United States Patent [19]

Hokazono et al.

[11] Patent Number: 6,063,480

[45] Date of Patent: May 16, 2000

[54] ARTIFICIALLY PATINATED COPPER MATERIAL

[75] Inventors: Takashi Hokazono; Shinji Tanaka, both of Osaka-fu, Japan

[73] Assignee: Sambo Copper Alloy Co., Ltd., Osaka-fu, Japan

[21] Appl. No.: 09/104,009

[22] Filed: Jun. 24, 1998

[30] Foreign Application Priority Data

Nov. 17, 1997 [JP] Japan .................................... 9-315620

[51] Int. Cl.$^{7}$ ........................................................ B32B 3/00

[52] U.S. Cl. .......................... 428/206; 428/208; 428/328; 428/336; 428/461; 428/469; 428/698

[58] Field of Search .................................... 428/206–208, 428/328, 336, 461, 469, 698

[56] References Cited

U.S. PATENT DOCUMENTS 5,160,381 11/1992 Gervais .................................. 148/269
5,376,190 12/1994 Hoveling ................................ 148/269
5,858,122 1/1999 Tani et al. ............................... 148/240

FOREIGN PATENT DOCUMENTS 7-216590 8/1995 Japan ............................ C25D 11/34

*Primary Examiner*—Timothy M. Speer
*Assistant Examiner*—Bryant Young
*Attorney, Agent, or Firm*—Griffin, Butler, Whisenhunt & Szipl, LLP

[57] ABSTRACT

An artificially patinated copper plate in which a copper sulfide layer 2 is formed on the surface of a copper base plate 1 by sulfiding for coating the same, and the copper sulfide layer 2 having an artificially patinated layer 3 is formed distributed and bonded thereon by spraying a resin solution mixed with basic copper carbonate constituting the main component of natural patina. The percentage of the area occupied by the artificially patinated layer 3 on the copper sulfide layer 2 is most preferably 25% to 80% and the thickness of the copper sulfide layer 2 is most preferably 0.1 to 0.5 $\mu$m.

13 Claims, 2 Drawing Sheets

ARTIFICIALLY PATINATED COPPER MATERIAL

FIELD OF THE INVENTION

The present invention relates to an artificially patinated copper material well-suited for roofing and other uses and to a method of making the same.

BACKGROUND OF THE INVENTION

Coming into contact with an atmosphere containing moisture, copper generally changes in color over the years from its original reddish orange to brown, dark brown, blackish brown, and patina, until a natural patina is formed on the surface of copper. The natural patina produced on copper plate in that manner is formed of such compounds as basic copper sulfate, basic copper carbonate, and basic copper chloride, individually or in combination. This patina constitutes a stable and tightly bonded protective film, hard to dissolve in water. Patinized copper is suitable for roofing and other uses where a high degree of weather resistance is required. Moreover, the patina film produces excellent design effects on the appearance of copper roofing and is very important in improving the aesthetic appearance of copper articles.

However, it takes a long time to produce a natural patina. Often it will be 20 to 30 years before a natural patinated film has sufficiently developed.

Meanwhile, artificially patinated copper plates such as one prepared by subjecting the surface of the copper plate to a chemical coloring treatment with chemical solutions and then forming a resin layer on the copper plate surface for coating the same have been proposed and put to practical use.

The problem with such chemically-colored copper plates is that because of a large difference in extensibility between the copper base and the resin layer, the chemically-colored copper material is very poor in formability and is not suitable for use as roofing, where such vigorous bending as folding is required. In other words, when subjected to bending, for example, the resin layer will peel off because of the difference in the amounts of extension and compression between the two layers.

There is another problem with the chemically-colored copper material. Because of poor adhesion between the copper base and the artificial patinated layer, there is a possibility that part of the artificial patina will peel off or fall off in a relatively short time, namely before the natural patina has grown enough. At the places where the artificially patinated layer peels off or falls off, the surface of the base copper where no natural patina has grown is exposed. The exposed copper surface takes on the brown color peculiar to copper oxide, greatly spoiling the outward appearance of the whole copper material.

OBJECTS OF THE INVENTION

It is an object of the present invention to provide an artificially patinated copper material with a high commercial value for copper roofing and other uses, which material has an appearance similar to that of a fully grown natural patina before a natural patina has fully developed, especially during the growing stage of natural patina.

It is another object of the present invention to provide an artificially patinated copper material in which the portions of the copper sulfide layer with no artificial patina layer formed thereon (the exposed sulfide surfaces) are not surface treated such as with clear coating or the like, and come into direct contact with the atmosphere, so as to allow a natural patina to grow, thereby permitting smooth transition to natural patina.

It is still another object of the present invention to provide an artificially patinated copper material which is excellent in formability and is suitable for use as roof plate, etc., wherein the artificial patina or copper sulfide does not peel off nor fall off even in vigorous bending (such as folding), while retaining the intrinsic forming properties of copper material, because artificial patina layers are formed in spots (distributed over the surface) and the underlying layer or copper sulfide layer is firmly bound to the copper base material by chemical reaction by sulfide treatment.

It is a further object of the present invention to provide an artificially patinated copper material in which main components of the artificial patina layer are inorganic particles (preferably basic copper carbonate or basic copper sulfate for considerations of color tone, etc.), which particles are components of natural patina, and thus in which the appearance and the composition are unsurpassed by those of the natural patinated material.

It is a still further object of the present invention to provide a method of making an artificially patinated material that permits continuous production of the foregoing artificially patinated copper material while keeping up quality yet greatly lowering the production cost and the product price.

SUMMARY OF THE INVENTION

Those and other objects can be attained by forming a copper sulfide layer on the surface of copper base material for coating the same by sulfiding and by forming a bluish-green artificial patinated layer in spots or distributed form on the surface of that copper sulfide layer. Thus, in the artificially patinated copper material of the present invention, a copper base material is treated by sulfiding to form a copper sulfide layer on the surface of the copper base material for coating the same, followed by "spottily" forming artificial patina layers on the copper sulfide layer, to effect the foregoing objects.

Prepared in this way, the artificial patinated copper material of the present invention has the copper sulfide layer formed through a chemical reaction between sulfur and copper dissolving out of the copper base material by sulfiding and chemically bound to the copper base material or bonded to the surface so firmly that there is no concern that the copper sulfide layer will peel off of the copper base material in forming the copper plate.

Distribution/Appearance

The surface of copper sulfide is not entirely covered by the artificially patinated layer, but is dotted with the artificially patinated layer formed thereon. That is, the artificially patinated layer is formed of a great number of artificially patinated layer grains distributed over the surface of copper sulfide layer. Because of this arrangement, even when the copper base material or the copper sulfide layer is extended or compressed in processing, the artificial patinated layer grains remain firmly bound and bounded. Only the distance between those grains changes as the copper sulfide layer surface is extended or compressed. That is to say, even if the copper sulfide layer and the artificially patinated layer are extended or compressed to different degrees, there will be no separation between the two layers caused by a difference in amounts of extension or compression between the two layers, unlike the case in which the artificial patinated layer adheres to the entire surface of the copper sulfide layer. As a result, the artificial patinated layer which is formed of distributed artificial patinated layer grains does not peel off of or fall off of the copper sulfide surface.

In forming the artificially patinated copper plate into a desired shape, especially in such vigorous bending as folding of a roof plate, there is no concern that the copper sulfide layer and the artificially patinated layer will peel off of or fall from the copper base. Thus the artificially patinated layer of the present invention is excellent in formability.

The surface of the copper sulfide layer is not covered completely with the artificially patinated layer. Thus, areas between the artificially patinated layer grains are exposed bare. They are not treated on the surface with clear coating or the like, so that they are in direct contact with atmospheric components including moisture. Since the copper base is, in addition, partially oxidized by sulfiding (this partial oxidation indicates that the copper sulfide layer is formed not of copper sulfide alone but a combination of copper sulfide and cuprous oxide), a natural patina will grow on the exposed sulfide surface smoothly. It is also noted that because the copper sulfide layer takes on a dark brownish color (close to black), the copper base color (the reddish orange color peculiar to copper), before it id patinated, being under the exposed sulfide surface does not appear on the surface of the copper base, and does not affect or impair the appearance or the aesthetics while a patina grows.

Therefore, although an artificially patinated layer is formed on the surface of the copper base, the growth of natural patina is promoted as smoothly as, or even more smoothly than, when the copper material itself is exposed. Thus, a very excellent appearance is obtained on this patinated copper plate, starting with the period from the application stage of the copper plate (stage of roofing work) to the time that a natural patina has fully grown.

Patina Materials

Any components that take on a blush-green color and can be bonded to the copper sulfide layer can be used as composition for the artificially patinated layer, but it is preferable to use components that go into natural patina. In other words, it is preferable is that the artificially patinated layer should be formed of a hardened resin solution mixed with particles of an inorganic bluish green substance which constitutes the main component of the natural patina.

Generally known as constituting the main components of natural patina are greenish basic copper carbonate, deep-greenish basic copper sulfate, and greenish-blue basic copper chloride. But it is preferable that basic copper carbonate or basic copper sulfate should be used as inorganic particles in accordance with the present invention, depending on the desired color tone in the artificially patinated layer. If basic copper carbonate and/or basic sulfate, both main components of natural patina, is/are used as inorganic particle, it is possible to obtain an artificial patina layer very close to the natural patina in composition, too. More than one kind of inorganic particle may be used in combination depending on requirements such as the desired color tone. For example, basic copper carbonate and basic copper sulfate may be mixed in a selected ratio, and used.

Also, in case an artificially patinated layer is to be formed with such inorganic particles as basic copper sulfate and basic copper carbonate mixed in a resin solution, it is preferable that portions of the inorganic particles should be exposed bare. That is, a portion of all or some of the individual inorganic particles is left extruding out of the resin. If the inorganic particles having the same substance as the main components of natural patina are exposed in part, the exposed area will come into direct contact with the moisture and other components of air and become a starting point for growth of natural patina. In this way, the transition to a natural patina will proceed smoothly in cooperation with the growth of natural patina on the exposed sulfide surface.

But even if the foregoing inorganic particles are not partly exposed when an artificially patinated layer is formed, part of the inorganic particles will be inevitably exposed bare in many cases while the artificially patinated copper plate is in service and that in a relatively early stage. To put it another way, even if an artificially patinated layer is formed with part of the inorganic particles not being exposed out of the resin or with the inorganic particles being enclosed in the resin in a capsule form, a portion of the inorganic particles present in the surface layer of the resin capsule will be covered with only a thin coat of resin. The resin coat isolating the inorganic particles from the atmosphere is such a thin film that it will degrade and fall off in a relatively short time when exposed to the outdoor air. This way, the resin film will degrade and fall, and part of the inorganic particles will be exposed bare, so that a natural patina will start to grow the same way as described above.

It is also preferable that the percentage (herein after referred to as artificially patinated layer density) of the artificially patinated layer grain area to the area of the copper sulfide layer (usually the surface area of the copper base), that is the percentage of the area occupied by the group of the artificially patinated layer grains to the copper sulfide layer should be not larger than 90%. If the artificially patinated layer density exceeds 90%, then the formability will deteriorate, with there arising a possibility of the artificially patinated layer falling off in forming work due to the difference in extension and compression amounts between the copper sulfide layer and the artificially patinated layer just as in the case that the copper sulfide layer is entirely coated with an artificially patinated layer.

In the copper plate for such vigorous bending as folding, however, the artificially patinated layer density is preferably not higher than 80%. That is, if the artificially patinated layer density exceeds 80% but does not exceeds 90% the copper plate can be formed without the artificially patinated layer falling off in usual forming work but there will be concern that the artificially patinated layer will peel off at the bending line in such extreme bending work as folding. This will be quite apparent from the results of bending resistance tests to be described later (Table 1).

On the other hand, in case the artificially patinated layer density is low, it will not affect the formability (it will not cause the artificially patinated layer to fall off) no matter how low it is, but it could affect the appearance. Thus, if the artificially patinated layer density is less than 25%, the greenish tone on the artificially patinated copper plate will be weak, which will render an appearance different from that of the natural patinated copper plate. If the artificially patinated layer density is not lower than 25%, its appearance will resemble that of the natural patinated copper plate. If the density exceeds 30%, the artificially patinated copper plate will take on an appearance equal to that of the natural patinated copper material.

For formability and outward appearance, therefore, the artificially patinated layer density is preferably between 20% and 90%. In copper plates to be subjected to vigorous bending like folding, the artificially patinated layer density is preferably between 25% and 80% (more preferably between 30% and 80% if the outward appearance is to be considered).

While artificially patinated layer grains uniform in size, form, and dispersion state may be used, it is generally preferable that artificially patinated layer grains different in size and form should be dispersed in a random manner to make the artificially patinated copper plate look like a natural one.

Copper Sulfide Layer

The copper sulfide layer should be uniform in thickness between 0.05 and 1 μm, preferably between 0.1 and 0.5 μm. That is, if the thickness of the copper sulfide layer is less than 0.05 μm, the reddish gloss (reddish orange color) on the surface of the copper base will appear on the exposed sulfide surface of the copper sulfide layer and may impair the appearance seen before natural patina grows. In order not to allow the surface color of the copper base material to impair the appearance seen before natural patina grows, the thickness of the copper sulfide layer should be not lower than 0.05 μm. And if the thickness is not lower than 0.1 μm, then that surface color of the copper base can be hidden completely. But if the thickness of the copper sulfide layer exceeds 1 μm, the adhesion between the copper base and the copper sulfide layer will decrease substantially. To maintain the adhesion between the two layers, the thickness of the copper sulfide layer should be not larger than 1 μm. With the copper plates to be subjected to vigorous bending like folding, the thickness should be preferably not larger than 0.5 μm so that the adhesion between the two is secured.

In the method of making such artificially patinated copper plates according to the present invention, the surface of the copper base is subjected to sulfiding treatment to form a copper sulfide layer covering the copper base, on which copper sulfide layer the distributed greenish-blue artificially patinated layer grains are formed and bonded. On the surface of the copper sulfide layer, preferably a resin solution mixed with inorganic fine particles (preferably fine particles of basic copper carbonate or basic copper sulfate) should be sprayed, followed by drying for hardening of the sprayed particles, to form and bond an artificially patinated layer.

As base copper material for artificially patinated copper plate, copper or copper alloy plate is selected depending on the type of finished product desired. It is desirable that the surface of the copper base or the surface on which a copper sulfide layer is formed should be given suitable pretreatment. Prior to sulfiding treatment, for example, it is desirable to give such treatments as polishing, acid cleaning (usually with 5% dilute sulfuric acid), rinsing, and drying to the copper base surface.

Sulfiding is usually performed using a sulfiding solution or an aqueous solution containing sodium sulfide as main component. The sulfiding solution may be mixed with silicate, etc., to improve the adhesion between the copper base and the copper sulfide layer where necessary.

Sulfiding is carried out in such a manner that a copper sulfide layer with a uniform thickness is formed on the surface of the copper base. The layer thickness should be selected in consideration of the adhesion between the copper base and copper sulfide layer and transparency of the exposed sulfide surface. To be specific, the thickness should be 0.05 to 1 μm, preferably between 0.1 and 0.5 μm, as mentioned above.

It is desired that suitable intermediate treatments like neutralization should be given after sulfiding, before the treatment to form an artificially patinated layer. Following rinsing, for example, the sulfided copper plate should be given a neutralization treatment with a selected naturalization liquid (usually with a 5% sodium sulfate solution), followed by rinsing and drying.

Patinization

In the treatment to form an artificially patinated layer, a resin solution mixed inorganic particles (basic copper carbonate or basic copper sulfate in the state of fine particle) is sprayed, which is then dried and hardened. The preferred spray solution is a water-soluble resin solution with good permeability mixed with inorganic particles (of basic copper carbonate or basic copper sulfate) and small quantities of plasticizer, corrosion inhibitor, and so on. As resin, either the water-soluble or the water-dispersible type can be used. To be specific, a choice can be properly made among acrylic resin, polyester resin, polyurethane resin, and other resins according to the requirements in use of the copper plate.

As a plasticizer, butyl cellosolve or dioctyl phthalate (DOP) may be added in small quantities. Also, the addition of a corrosion inhibitor is desired to protect the copper base material from corrosion. Generally, aqueous benzotriazole (BTA) is used. The addition is very small in comparison with the inorganic particles (of basic copper carbonate or basic copper sulfate).

The resin solution is generally applied to the surface of the copper sulfide by spray nozzle. By changing the spray pressure, tank pressure, and so on, it is possible to adjust the size and dispersion (artificially patinated layer density) of artificially patinated layer grains, whereby the design (for instance, color tone of artificially patinated layer) of the copper plate surface can be freely planned.

The artificially patinated layer grains formed on the copper sulfide layer by spraying are quite varied in size and degree of dispersion (i.e. distance between grains). This brings about a surface condition close to that of a natural patinated copper plate.

The preferred temperature of drying after spraying is generally high at about 100° C.

DESCRIPTION OF PREFERRED EMBODIMENTS

EXAMPLE 1

Figure 1:
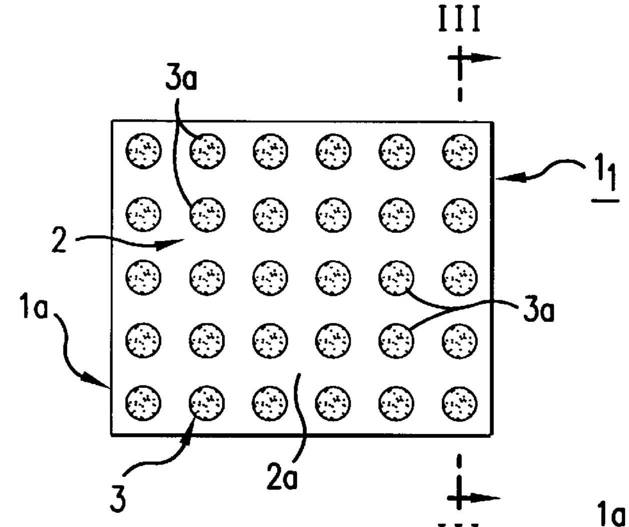
FIG. 1 is a top view schematically showing the first copper plate, an artificially patinated copper plate according to the present invention.
Figure 3:
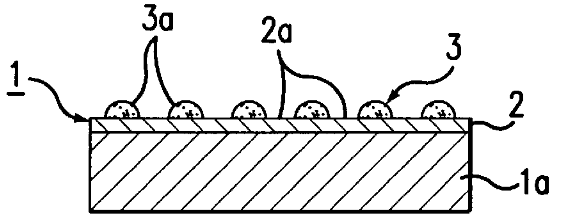
FIG. 3 is a section taken on line A—A in FIG. 1 or FIG. 2.
Figure 4:
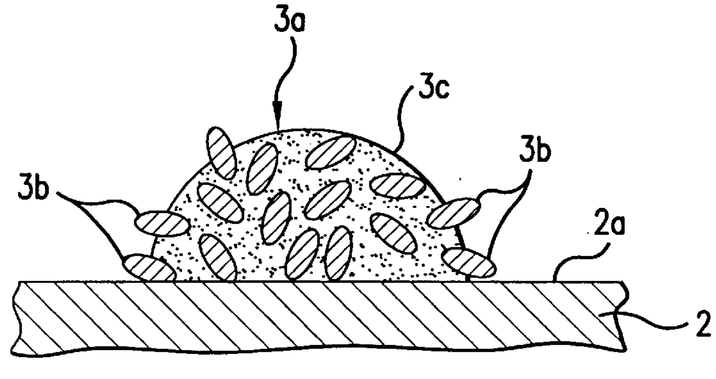
FIG. 4 is an enlarged detail view of the main part in FIG. 3.

In a first embodiment, an artificially patinated plate 1 (the first copper plate $\mathbf{1}_1$) as shown in FIGS. 1 and 3 was obtained by the following procedure.

A rectangular copper base plate 1*a* 0.35 mm in thickness, 365 mm in width, and 1212 mm in length was first polished on the surface, then cleaned with a 5% dilute sulfuric acid, rinsed, and dried. The surface of this copper base plate 1*a* was treated with a sulfiding solution to form a copper sulfide layer 2 thereon. The sulfiding solution used was one made up of 100 liters of water, 12 kg of sodium sulfide, and 1 kg of sodium silicate. A copper sulfide layer 2 with a uniform thickness of about 0.3 μm was formed on the whole surface of the copper base plate 1*a*. After being sulfided in this manner, the plate was neutralized with 5% sodium sulfate, followed by rinsing and drying.

Subsequently, a resin solution mixed with basic copper carbonate in particle form was sprayed on the surface of the copper sulfide layer 2, which was then dried at 100° C. to form and bond distributed, artificially patinated layer 3 whereby the first copper plate $1_1$ was obtained. The resin solution that was sprayed in this procedure made up of 16 kg of water-soluble acrylic resin, 8.5 kg of basic copper carbonate, 0.5 kg of butyl cellosolve, 0.5 kg of DOP, and 4.5 kg of BTA water.

Figure 5:
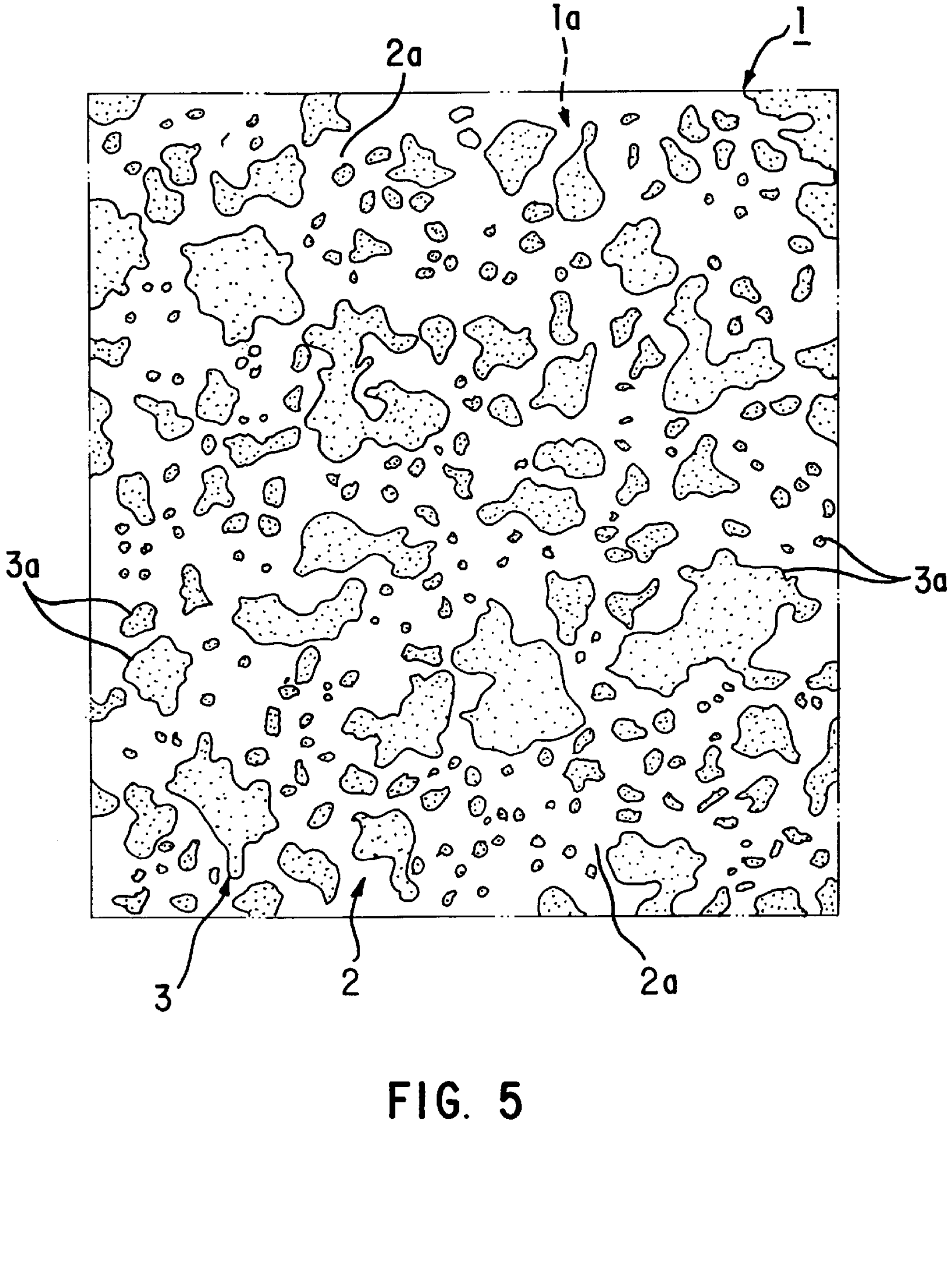
FIG. 5 is an enlarged top view showing an example of the actual surface condition of an artificially patinated copper plate according to the present invention.

Spraying was conducted using a spray nozzle in such a way that artificially patinated layer grains 3*a* were formed on the copper sulfide layer 2 in a dispersed pattern as shown in FIG. 1. It is to be understood that FIG. 1 schematically shows the dispersed state of artificially patinated layer grains 3*a*. In practice, artificially patinated layer grains 3*a* of various sizes and shapes are formed on the surface of the copper sulfide layer 2 in a randomly dispersed pattern as shown in FIG. 5.

Spraying was conducted to obtain an artificially patinated layer density of 30%. The artificially patinated layer density is defined as the percentage of the area occupied by the artificial patinated layer 3 on the surface of the copper sulfide layer 2. That is, the artificially patinated layer density reflects the ratio of the area occupied by all of the artificially patinated layer grains 3*a* to the whole surface area of the copper sulfide layer 2.

After spraying, the plate was dried at a temperature of 100° C. to dry and harden the artificially patinated layer grains 3*a*. Each artificially patinated layer grain 3*a* is in the form of capsule enclosing patina component copper carbonate in the resin, but part of inorganic particles 3*b* of basic copper carbonate are exposed out of the resin bed 3*c* and in direct contact with the atmosphere components. The copper sulfide 2—that is the exposed sulfide surface area 2*a* of the first copper plate $1_1$—takes on a dark brown, near black, color.

EXAMPLE 2

Figure 2:
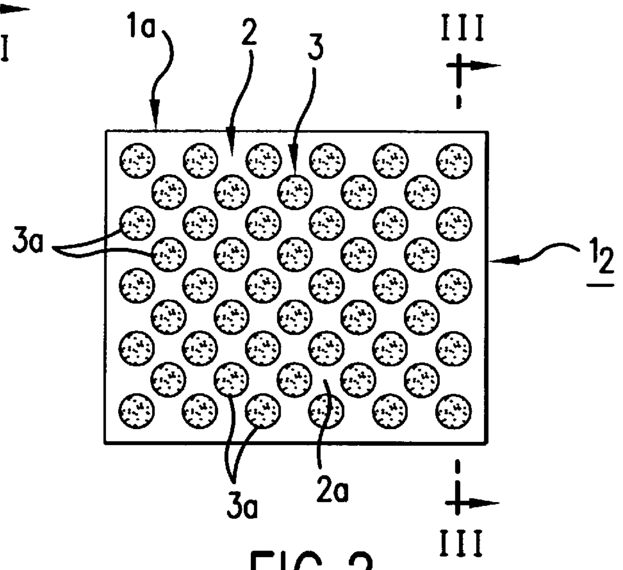
FIG. 2 is a top view schematically showing the second copper plate, another artificially patinated copper plate according to the present invention.

In a second embodiment, another artificially patinated plate 1 (the second copper plate $1_2$) as shown in FIGS. 2 and 3 was obtained under the same conditions as in Example 1, using however a spray solution of partly different quantities of the components and partly different spray conditions.

The sprayed solution in the second embodiment was made up of 16 kg of the aforementioned resin, 10.2 kg of basic copper carbonate, 0.5 kg of butyl cellosolve, 0.5 kg of DOP, and 3.7 kg of BTA water. The spraying condition were so set that the artificially patinated layer density was 80%. That is to say, the percentage of the exposed sulfide surface 2*a* was lower than that on the first copper plate $1_1$.

It is to be understood that FIG. 2 schematically shows the dispersed state of artificially patinated layer grains 3*a*. In the second copper plate $1_2$, too, artificially patinated layer grains 3*a* of various sizes and shapes are formed on the surface of the copper sulfide layer 2 in a randomly disperse pattern as in the first copper plate $1_1$ (FIG. 5). Also, as in the first copper plate $1_1$, each artificially patinated layer grain 3*a* is in the form of capsule with patina component copper carbonate enclosed in resin, but part of inorganic particles 3*b* of basic copper carbonate are exposed out of the resin bed 3*c* and in direct contact with the atmosphere.

Bending Resistance Testing

As indicated, the first copper plate $1_1$ and the second copper plate $1_2$ differ from each other in regard to the percentage (or density) of artificially patinated layer grains 3*a* on the plate surface and color tone. However, both have surface conditions not different from those of a naturally patinated copper plate. Therefore, not much difference is observed in the surface condition of the copper plates $1_1$ and $1_2$ between before and after natural patina is fully grown.

Thus, the transition to a naturally patinated copper plate proceeds smoothly, in regard to aesthetic appearance, without an appearance of discontinuity to a naturally patinated copper plate from a copper plate merely with an artificial patina.

The copper plates $1_1$ and $1_2$ were put to the following tests of physical properties-bending resistance, impact resistance, and accelerated weather resistance.

In the bending resistance test, each plate was bent 180° (folded) with three pieces of copper base plate 1*a*, two pieces of copper base plate 1*a*, one piece of copper base plate 1*a*, and no copper base plate 1*a* placed inside the fold. The results were that nothing abnormal was observed in bending. No problems, such as peeling off of the copper sulfide layer 2 or the artificially patinated layer 3 in any of the plates, was observed, as shown in Table 1.

Further, each copper plate bent 180° was hammered flat after the sandwiched copper base plates 1*a* were removed. In this test, part of the artificially patinated layer grains 3*a* fell off in extremely small amounts. From those results, it was confirmed that the copper plates $1_1$ and $1_2$ were so high in forming properties (bending resistance) that they are well-suited for such vigorous bending as folding.

In Table 1, the symbol O indicates the copper plates in which neither the artificially patinated layer nor the copper sulfide layer peeled off, Δ indicates the copper plates in which the artificially patinated layer and/or the copper sulfide layer peeled off in small amounts, and X indicates the copper plates in which the artificially patinated layer and/or the copper sulfide layer definitely peeled off.

EXAMPLES 3–5

Still another artificially patinated copper plate (the third copper plate) was made using the same composition and procedure as those for the first copper plate $1_1$ except that in the third copper plate, the artificially patinated layer density was 80% and the thickness of the copper sulfide layer was 0.5 μm. A further artificially patinated copper plate (the fourth copper plate) was made using the same composition and procedure as those for the third copper plate except that in the fourth copper plate, the artificially patinated layer density was 90%. Yet another artificially patinated copper plate (the fifth copper plate) was made using the same composition and procedure as those for the third copper plate except that in the fifth copper plate, the thickness of the copper sulfide layer was 1.0 μm.

Those copper plates were put to the same bending resistance test as described above. The results were that the artificially patinated layer and the copper sulfide layer did not peel off at all in the third copper plate irrespective of the number of base plates sandwiched in the bending fold as shown in Table 1. In the fourth copper plate, while the artificially patinated layer peeled off in small amounts in a bending test with no or one copper base plate sandwiched (but no peeling off was caused of the copper sulfide layer), no peeling off of the artificially patinated layer nor the copper sulfide layer was observed in bending with two or three pieces of the copper base plate sandwiched in the fold. In the fifth copper plate, too, while there the copper sulfide layer peeled off in small amounts in a test with no or one copper base plate sandwiched, no peeling off of the artificially patinated layer nor the copper sulfide layer was observed in bending with two or three pieces of the copper base plate sandwiched.

COMPARATIVE EXAMPLES

Furthermore, a comparative artificially patinated copper plate (the first comparative copper plate) was made using the same composition and procedure as those for the third copper plate except that the artificially patinated layer density was 95%. Another comparative artificially patinated copper plate (the second comparative copper plate) was made using the same composition and procedure as those for the third copper plate except that the thickness of the copper sulfide layer was 1.2 μm. Still another comparative artificially patinated copper plate (the third comparative copper plate) was made using the same composition and procedure as those for the first comparative copper plate except that the thickness of the copper sulfide layer was 1.2 μm.

Those copper plates were put to the same bending resistance test as described above. The results were, as shown in Table 1, that in the first comparative copper plate, no peeling off of the copper sulfide layer was caused but the artificially patinated layer clearly peeled off in bending with no or one piece of the copper base plate sandwiched and some peeling off of the artificially patinated layer was observed in bending with two or three pieces of the copper base plate sandwiched. In the second comparative copper plate, no peeling off of the artificially patinated layer from the copper sulfide layer was observed but there was found definite peeling off of the copper sulfide layer in bending with no or one piece of the copper base plate sandwiched and some peeling off of the copper sulfide layer was observed in bending with two or three pieces of the copper base plate sandwiched. In the third comparative copper plate, definite peeling off of the artificially patinated layer and the copper sulfide was caused irrespective of the number of the copper base plates sandwiched.

These test results demonstrate that the artificially patinated layer density should be not greater than 80% and that the thickness of the copper sulfide layer should be not greater than 0.5 μm in copper plates to be subjected to vigorous bending (folding etc.). It was also noted that even if no vigorous bending is to be performed (that is to say, when usual bending serves the purpose), it is desirable that the artificially patinated layer density should be not greater than 90% and the thickness of the copper sulfide layer should be not greater than 1.0 μm.

TABLE 1

| Artificially patinated copper plate | Artificially patinated layer density (%) | Thickness of copper sulfide layer (μm) | Bending resistance test (bending at 180°) Number of copper base plates sandwiched in fold | | | |
|---|---|---|---|---|---|---|
| | | | 0 | 1 | 2 | 3 |
| First copper plate | 30 | 0.3 | ○ | ○ | ○ | ○ |
| Second copper plate | 80 | 0.3 | ○ | ○ | ○ | ○ |
| Third copper plate | 80 | 0.5 | ○ | ○ | ○ | ○ |
| Fourth copper plate | 90 | 0.5 | Δ | Δ | ○ | ○ |
| Fifth copper plate | 80 | 1.0 | Δ | Δ | ○ | ○ |
| First comparative copper plate | 95 | 0.5 | X | X | Δ | Δ |
| Second comparative copper plate | 80 | 1.2 | X | X | Δ | Δ |
| Third comparative copper plate | 95 | 1.2 | X | X | X | X |

TABLE 1-continued

○ = no peeling
Δ = small amount of peeling
X = definitive peeling

Impact Resistance

The impact resistance test was carried out the following way: a 500 g weight ¼ inch in diameter was allowed to fall from an altitude of 50 cm onto the artificially patinated surface of the copper plates $\mathbf{1}_1$ and $\mathbf{1}_2$. Adhesive tape was then adhered to the hit area and was pulled off to see if the artificially patinated layer 3*a* would peel off. Nothing abnormal was found with any of the copper plates $\mathbf{1}_1$ and $\mathbf{1}_2$ with no part of the artificially patinated layer 3*a* found sticking on the adhesive tape (no peeling). The same impact resistance test was performed on the third to fifth copper plates, and nothing abnormal was caused, as with the first and second copper plates $\mathbf{1}_1$ and $\mathbf{1}_2$.

Accelerated Weathering

The accelerated weather resistance test, which lasted 1000 hours, was conducted using a weatherometer of the carbon arc type. Nothing abnormal was observed in any of the copper plates $\mathbf{1}_1$ and $\mathbf{1}_2$. The third to fifth copper plates were also put to the same accelerated weather resistance test, and nothing abnormal was observed, as with the first and second copper plates $\mathbf{1}_1$ and $\mathbf{1}_2$.

Outdoor Exposure Testing

In addition, the first to fifth copper plates as well as ordinary copper material (deoxidized copper) were put to an outdoor exposure test in accordance with JIS Z 2381. The test was conducted within the premises of Sambo Copper Alloy Co., Ltd. in Sakai City, Osaka Prefecture. One year later, the plates were checked for growth of natural patina by X-ray diffraction.

Natural patina growing was clearly observed on all the first to fifth copper plates but almost no sign of natural patina growth was found on the ordinary copper plate. These results showed that natural patina begins to grow faster on the artificially patinated copper plate according to the present invention than on untreated copper plate.

Benefits

As is quite evident from the foregoing description, artificially patinated copper plate in accordance with the present invention assumes an outward appearance not different from that of a fully grown natural patina, even before a natural patina has fully grown. This is true especially even in the growing stage of natural patina, and thus the product of the present invention has a very high commercial value as copper roofing. Moreover, since the copper sulfide layer area (exposed sulfide surface), not treated on the surface with clear coating or the like, comes into direct contact with the atmosphere and grows a natural patina, the transition to a natural patina will proceed smoothly.

Additionally, because the artificially patinated layer grains are distributed and the underlying layer or the copper sulfide layer is firmly bound to the base copper plate by a chemical reaction in sulfiding, the copper plate according to the present invention is excellent in forming properties with no concern that the artificially patinated layer or the copper sulfide layer will fall off in vigorous bending such as folding.

With the intrinsic high formability retained, copper plate according to the present invention is quite suitable for roofing and other uses. Especially when the artificially patinated layer has the inorganic particles of the components of natural patina as its main component (in view of color tone and other considerations, basic copper carbonate or basic copper sulfate is preferably used), there can be provided an artificially patinated copper plate unsurpassed by the natural patinated copper plate in appearance and composition.

The manufacturing method according to the present invention permits continuous production of artificially patinated copper plates with a high degree of quality, yet with substantial reduction in production cost and price.

What is claimed is:

1. An artificially patinated copper material comprising a copper plate having formed on its surface a copper sulfide layer, wherein said copper sulfide layer in turn has formed and bonded on its surface in a distributed state an artificially patinated layer of greenish-blue color, the percentage of the area occupied by the artificially patinated layer on the surface of the copper sulfide layer being not greater than 90%.

2. The artificially patinated copper material as defined in claim 1, wherein said artificially patinated layer is formed by hardening a resin solution mixed with bluish-green inorganic particles of inorganic substances which constitute the main components of natural patina.

3. The artificially patinated copper material as defined in claim 2, wherein a portion of the inorganic particles are exposed to the atmosphere out of the artificially patinated layer.

4. The artificially patinated copper material as defined in claim 2 or claim 3, wherein said inorganic particles are basic copper carbonate or basic copper sulfate.

5. The artificially patinated copper material as defined in claim 1 claim 2 or claim 3, wherein the percentage of the area occupied by the artificially patinated layer on the surface of the copper sulfide layer is between 25% and 80%.

6. The artificially patinated copper material as defined in claim 1, claim 2 or claim 3, wherein the thickness of the copper sulfide layer is uniform at 0.05 to 1 μm.

7. The artificially patinated copper material as defined in claim 1, claim 2 or claim 3, wherein the thickness of the copper sulfide layer is uniform at 0.1 to 0.5 μm.

8. An artificially patinated copper material comprising a copper plate having formed on its surface a copper sulfide layer, wherein said copper sulfide layer in turn has formed and bonded on its surface in a distributed state an artificially patinated layer of greenish-blue color formed by hardening a resin solution mixed with bluish-green inorganic particles of inorganic substances which constitute the main components of natural patina, a portion of the inorganic particles being exposed to the atmosphere out of the artificially patinated layer.

9. The artificially patinated copper material as defined in claim 8, wherein said inorganic particles are basic copper carbonate or basic copper sulfate.

10. The artificially patinated copper material as defined in claim 8, wherein the percentage of the area occupied by the artificially patinated layer on the surface of the copper sulfide layer is not greater than 90%.

11. The artificially patinated copper material as defined in claim 8, wherein the percentage of the area occupied by the artificially patinated layer on the surface of the copper sulfide layer is between 25% and 80%.

12. The artificially patinated copper material as defined in claim 8, wherein the thickness of the copper sulfide layer is uniform at 0.05 to 1 μm.

13. The artificially patinated copper material as defined in claim 8, wherein the thickness of the copper sulfide layer is uniform at 0.1 to 0.5 μm.

* * * * *